United States Patent
Sanjeev et al.

(10) Patent No.: US 6,246,805 B1
(45) Date of Patent: Jun. 12, 2001

(54) EFFICIENT BEVELING OF EXTRUDED REGIONS IN VIDEO PROCESSING

(75) Inventors: Trika N. Sanjeev, Hillsboro; Michael D. Rosenzweig, Beaverton, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/204,344

(22) Filed: Dec. 4, 1998

(51) Int. Cl.[7] .................................................... G06K 9/36
(52) U.S. Cl. ............................ 382/285; 345/468; 345/471
(58) Field of Search .................................... 382/298, 285, 382/154; 345/127, 131, 439, 144, 435, 468–472, 467, 128, 141; 348/561, 581

(56) References Cited

U.S. PATENT DOCUMENTS

| | | | |
|---|---|---|---|
| 5,548,667 | * 8/1996 | Tu | 382/285 |
| 5,675,377 | * 10/1997 | Gikas | 348/47 |
| 6,033,627 | * 3/2000 | Shields et al. | 422/58 |
| 6,044,170 | * 3/2000 | Migdal et al. | 382/154 |
| 6,064,759 | * 5/2000 | Buckley et al. | 382/154 |

* cited by examiner

Primary Examiner—Joseph Mancuso
Assistant Examiner—Yosef Kassa
(74) Attorney, Agent, or Firm—Kenyon & Kenyon (57) ABSTRACT

A method for providing a beveling effect to a video polygon a second polygon is generated in a plane parallel to the first polygon. The second polygon is an expanded copy of the first polygon. Vertices of the first polygon are connected to corresponding vertices of the second polygon according to a predetermined beveling function.

35 Claims, 7 Drawing Sheets

EFFICIENT BEVELING OF EXTRUDED REGIONS IN VIDEO PROCESSING

BACKGROUND

The present invention relates to beveling of three-dimensional objects in a video display.

In video applications, video data may advance through several processing stages before video data is displayed on a video device. These stages may include modeling and rendering. Modeling refers to generation of information that is displayed on the video display. Rendering refers to conversion of this information to pixel data for display on the video device.

Figure 1A:
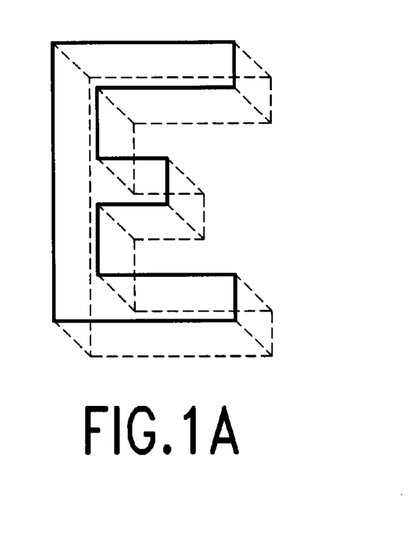
FIG. 1 illustrates an extruded region.
Figure 1B:
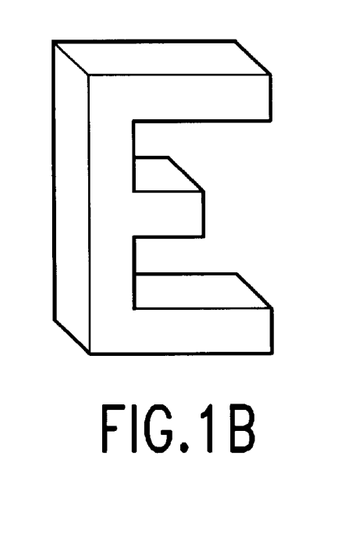
Figure 2A:
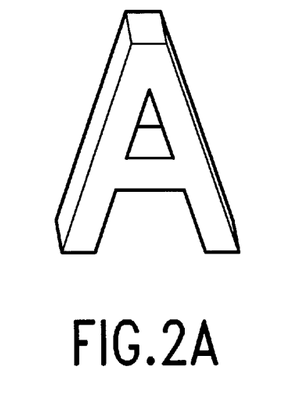
FIG. 2 illustrates three-dimensional models of a text character which has been subject to beveling.
Figure 2B:
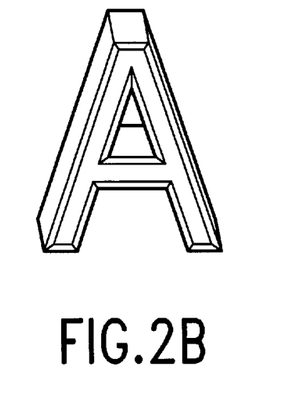
Figure 2C:
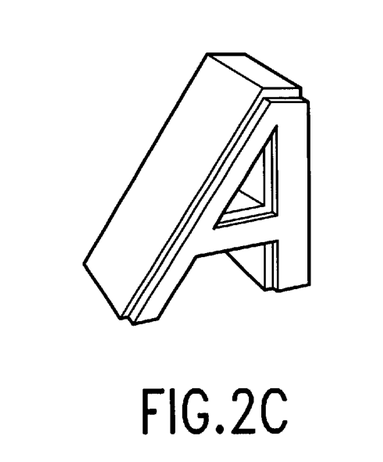
Figure 2D:
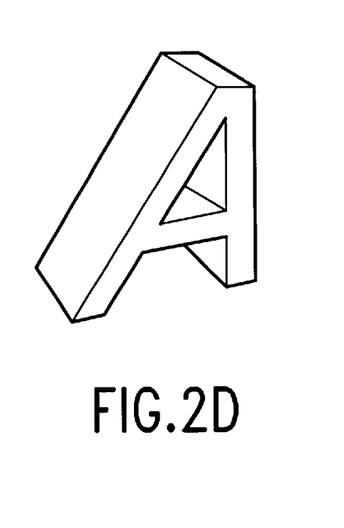
Figure 2E:
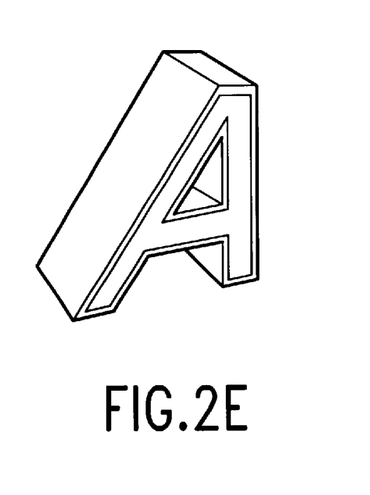

Modeling of most objects requires generation of three-dimensional meshes to represent the object. Modeling can be done by measuring the objects. This, however, tends to be very difficult, expensive and inaccurate. Extrusion is an alternate scheme that works well for several objects (see FIG. 1). A two-dimensional region is first specified by the human modeler. The modeler also specifies a path on which the region is to be extruded. A computer system then moves the two-dimensional region along the specified path, sweeping a volume that is then typically converted to a three-dimensional mesh representation (FIG. 1 (*a*)). The mesh can then be rendered or otherwise manipulated depending on the application. A rendered volume may be displayed as shown in FIG. 1(*b*).

The extruded regions often appear bland and lack character when rendered for display. They can be enhanced by beveling (see FIG. 2). Beveling mimics beveling in woodworking applications, wherein a carpenter uses a router to apply a rounding, flat or other effect to the corners and edges of real-world three-dimensional wooden objects. In video processing applications, beveling is a generalized extrusion scheme that belongs to the modeling stage. Beveling results in a three-dimensional mesh that, when rendered, appears more visually appealing than a plain extrusion (FIG. 2(*a*)–(*e*)). Beveling finds immediate applications in presentation environments, e.g., presentation authoring tools and computer networks such as the Internet.

Figure 3:
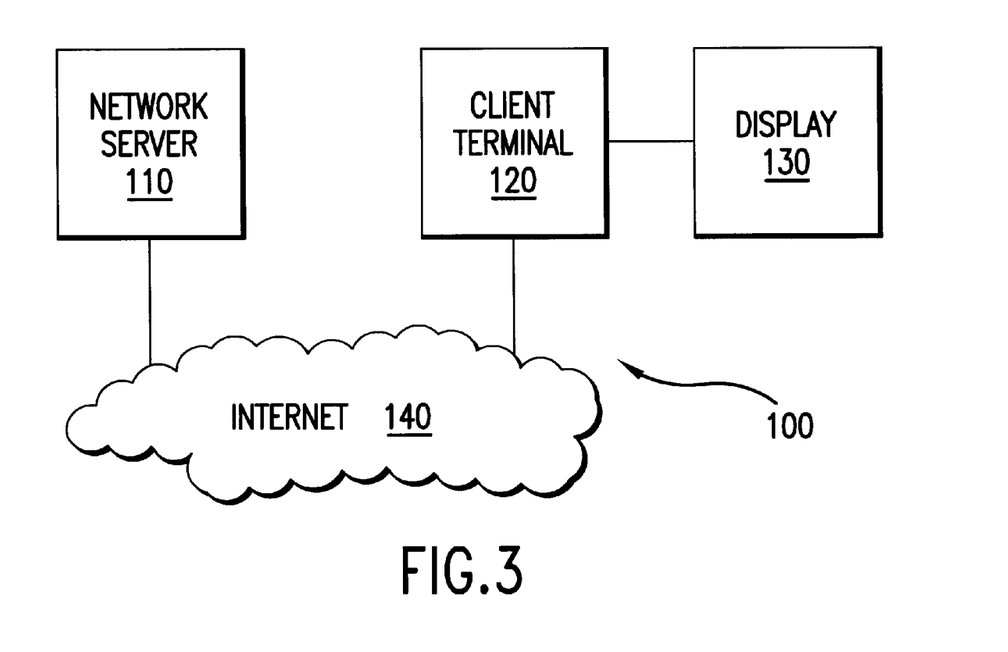
FIG. 3 is a block diagram of a computer network adapted to work with the present invention.

A block diagram of an illustrative computer network 100 is shown in FIG. 3. There, the network 100 includes a network server 110 and a client terminal 120. Client terminal 120 includes a display 130. The network server 110 and client terminal 120 may communicate with each other over Internet 140. The network server 110 stores video information for display at the client terminal 120. If the network server 110 rendered the video information into pixel data and transmitted the pixel data to the client terminal 120, the pixel data would consume a tremendous amount of bandwidth of Internet 140.

Over the Internet 140, where it is desirable to represent video information as efficiently as possible, beveling and extrusion can have tremendous impact by providing very low bandwidth representations of three-dimensional meshes. A beveled mesh may be defined by a description of the two-dimensional boundary, the path along which the mesh is to be extruded, a definition of a beveling effect, and a few parameters. The two-dimensional boundary can be omitted entirely if it can be implicitly specified, for example for text by a string, a font-name and style properties. In such a case, the client terminal 120, not the network server 110, would render the video information for display. Animation of such client-side generated meshes can easily and efficiently replace the expensive downloads of video data such as those that are required for spinning logos and the like.

Finally, beveling and extrusion provide a scalability advantage as well in that the quality of the generated meshes can be easily tied to the performance available on the computer system.

There is a need in the art for a fast and computationally inexpensive method for beveling extruded polygons.

SUMMARY

An embodiment of the present invention provides a method for providing a beveling effect to a first region, in which a second region is generated in a plane parallel to the first region. The second region maybe resized relative to the first region. Vertices of the first region are connected to corresponding vertices of the second region according to a predetermined beveling function.

DETAILED DESCRIPTION

Embodiments of the present invention provide a video processing method that applies a locally-generated extrusion and beveling effect to a two-dimensional region. According to an embodiment of the present invention, a first region is copied to a second plane and resized by an amount appropriate for a predetermined beveling effect. Vertices of the first region are connected to corresponding vertices in the second region according to the beveling function. The second region is extruded to define an object volume.

Figure 4A:
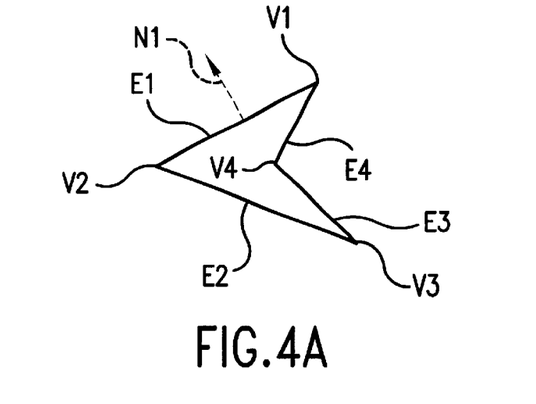
FIG. 4 illustrates an exemplary region subject to beveling.

Operation of various embodiments of the present invention are described with reference to an arbitrary exemplary region as shown in FIG. 4(*a*). A "region" is a two-dimensional object that serves as a basis for a definition of a three-dimensional object to be modeled and displayed. The exemplary region is defined by four vertices V1–V4. Each ordered pair of vertices (say, V1, V2) defines an edge (E1) of the region. The first and last vertices (V1, V4) define an edge (E4) that closes an area of the region. The vertices are defined in a predetermined order along the perimeter of the region. For example, in FIG. 4(*a*), the vertices are defined in a counter-clockwise order. The orientation (clockwise or counter-clockwise) of the vertex order permits a definition of an outward normal vector for each edge of the region. For example, outward normal vector N1 is shown in phantom corresponding to edge E1. Typically, only vertices V1–V4 are defined for a region during the modeling stage; edges E1–E4 generally are calculated during a rendering step.

Figure 4B:
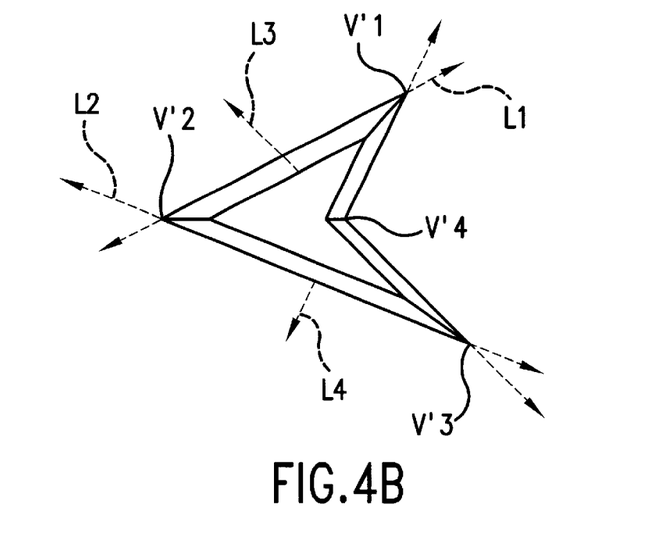
Figure 5:
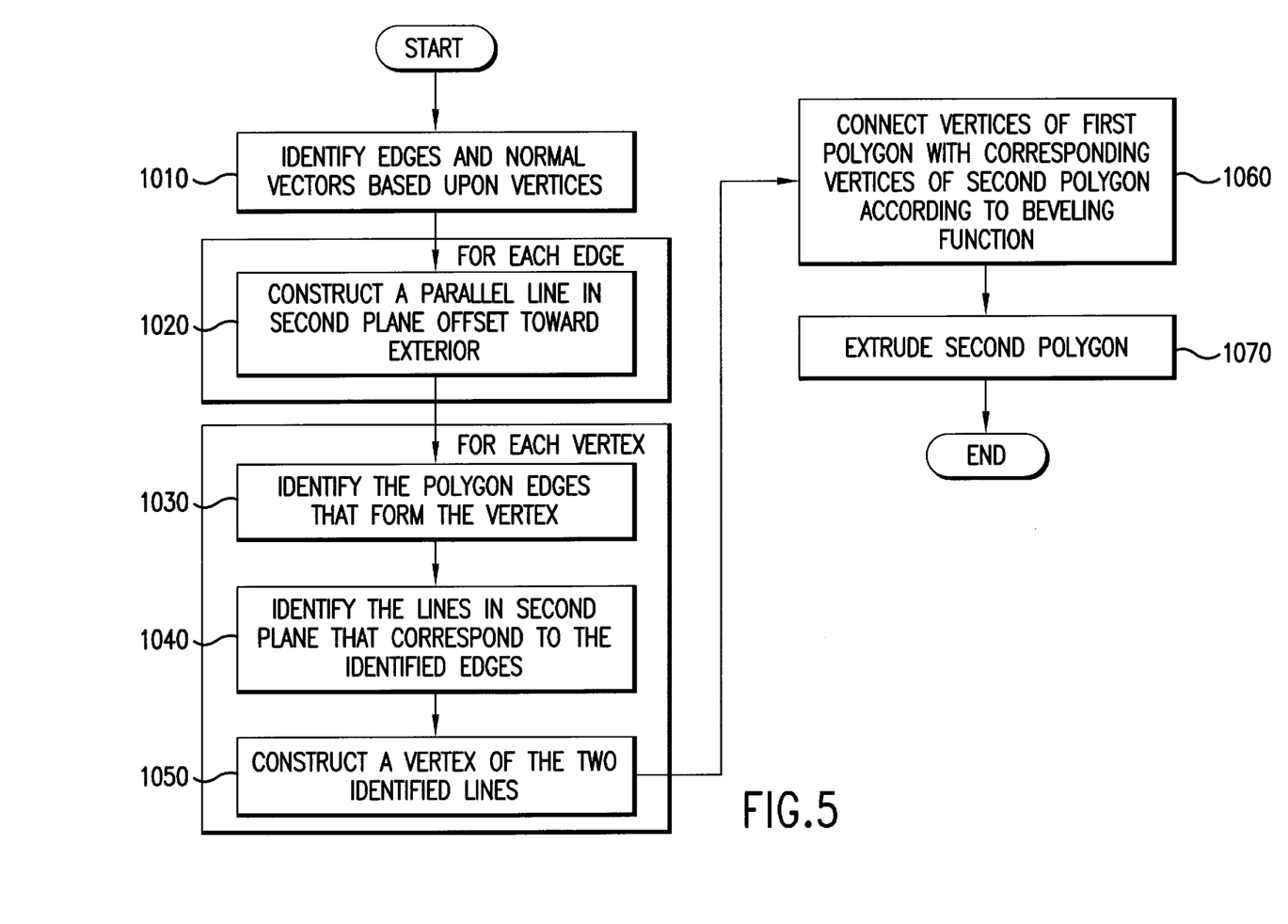
FIG. 5 illustrates a flow diagram of a method operating in accordance with an embodiment of the present invention.

Embodiments of the present invention may operate in accordance with the method of FIG. 5. The method of FIG. 5 defines edges of the region and outward normal vectors thereof based upon the stored vertices (V1–V4) (Step 1010). For each edge E1, E2, E3, E4 (FIG. 4(*a*)), the method of FIG. 5 generates a parallel line (L1, L2, L3, L4) in a second plane offset from the edge by a predetermined distance along the outward normal vector. (Step 1020) (See FIG. 4(*b*)). The offset may be positive distance (extending the lines toward the polygon's exterior) or a negative distance (extending the lines toward the polygon's interior). The offset is determined by a distance between the first and second planes and a beveling function that is to be used.

The method of FIG. 5 constructs vertices (V'1, V'2, V'3, V'4 of FIG. 4(*b*)) of a new region in the second plane. The vertices V'1–V'4 are constructed to correspond to the vertices of the first region. For each vertex of the first region, edges connected to each vertex are identified (Step 1030). For example, edges E2 and E3 (FIG. 4(*a*)) would be identified for vertex V3. For the identified edges, the corresponding lines are identified (L2 and L3 for edges E2 and E3) (Step 1040). A vertex V'3 is constructed from the intersection of the identified lines (Step 1050).

Figure 4C:
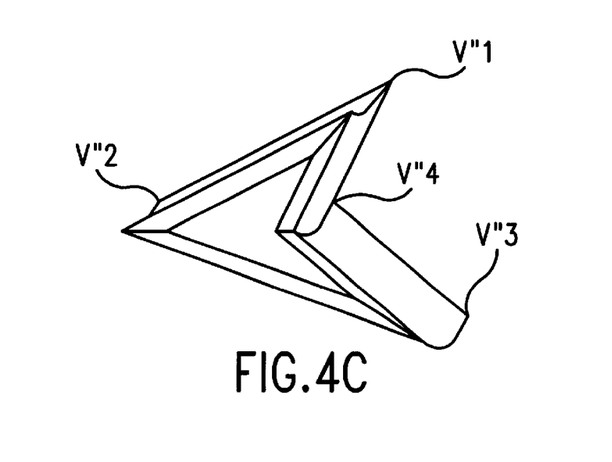

To complete the beveling effect, each vertex of the first region is connected to its corresponding vertex in the second region according to the beveling function (Step 1060). The beveling function varies in accordance with the beveling effect that may be desired. FIG. 4(*c*) illustrates the completed beveled volume.

After beveling is completed, the second region may be extruded according to a predetermined extrusion function (Step 1070). For each vertex V'1, V'2, V'3, V'4 of the second region, the extrusion function defines a line or curve extruding from the vertex to an end point in a third plane. The end points constitute vertices V"1–V"4 (FIG. 4(*c*)) of a third region. The third polygon may be said to define a "back face" of the three-dimensional object. The volume defined between the second and third planes is a volume that represents the extruded portion of the beveled object.

Alternatively, depending upon the desired beveling effect, the first polygon may be extruded according to the extrusion function.

Thus, based on a first defined region, an embodiment of the present invention defines a three-dimensional object having at least one beveled face.

Figure 6A:
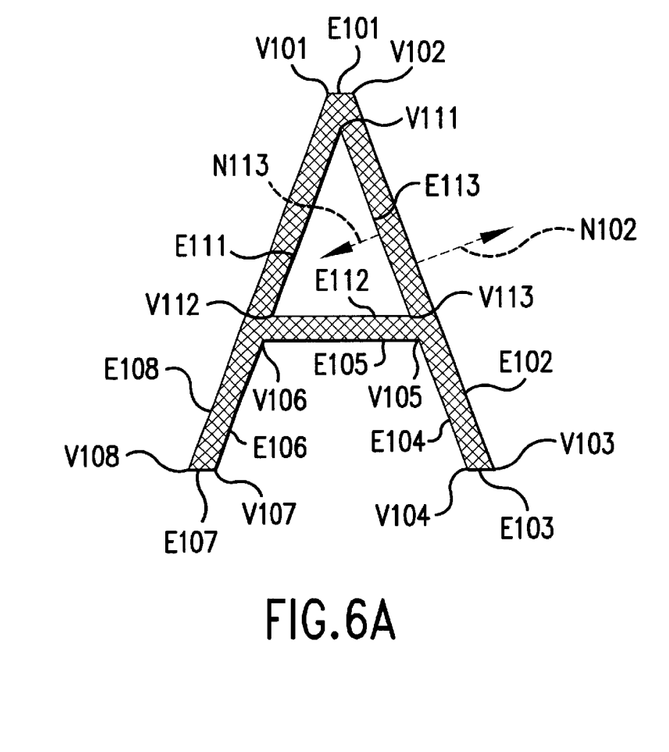
FIG. 6 illustrates a second exemplary region subject to beveling.

The present invention finds application with any two-dimensional region. As is known, regions may occur as one of two types: positive image space called "polygons" and negative image space (called "holes"). Polygons may enclose any number of holes and holes may enclose any number of polygons. Consider, as an example, the region representing the text character "A" in FIG. 6(*a*). The character is represented as a first positive space polygon enclosing a hole 20.

By convention, the vertices of the hole are defined in a different order than the vertices of the polygon. The polygon is defined by vertices V101–V108 provided, in this example, in a clockwise order. Hole is defined by vertices V111–V113 in different order than the vertices for the positive space polygon. Thus, vertices V111–113 are provided in a counter-clockwise order.

The convention for definition of vertices permits an identical processing to be performed to identify an outward normal vector for each edge E101–E108, E111–E13 regardless of whether the edge relates to the polygon or the hole. The "outward normal vector" of a hole may point toward the interior of a region, for example, as vector N113 does in FIG. 6(*a*). However, the outward normal vector always points away from the closed image space of the region. In FIG. 6(*a*), the closed image space is shown with a hash pattern; it is the area of the polygon less the area of any hole contained therein.

FIG. 6(*b*) illustrates the lines L101–L108 that are constructed corresponding to edges E101–108 from FIG. 6(*a*). Lines L101–108 may be obtained through normal operation of the method of FIG. 5. FIG. 6(*c*) illustrates the lines L111–L113 that are constructed corresponding to edges E111–113 from FIG. 6(*a*). Lines L111–L113 also may be obtained through normal operation of the method of FIG. 5 because vertices for holes are defined in a different order than for positive space polygons. FIG. 6(*d*) is a composite illustration superimposing the lines of FIGS. 6(*b*)&(*c*). FIG. 6(*e*) illustrates the beveling effect that is obtained when the method of FIG. 5 completes. The polygons obtained from lines L101–L108 and by L111–L113 may be extruded by step 1070 to define the body of the object. FIG. 6(*f*) illustrates a rendered object that may be obtained from the initial polygon of FIG. 6(*a*).

The method of FIG. 5 also finds application with regions that possess curved edges. In a first embodiment, an edge that is perceived as a curve actually may be modeled as a series of short line segments. In this case, the curved edges may be processed by the method of FIG. 5 without modification. In a second embodiment, curves may be modeled as portions of a circle, as splines or as nonuniform rational B-splines ("NURB"). For curves, it is also possible to identify outward normals and copy the curve to a second plane offset from the first curve some distance. Such techniques are known in the art.

Three-dimensional modeling may require that beveled edges be provided for more than one surface of the object (e.g. front, back, top and side). Optionally, the method of FIG. 5 may be repeated for as many surfaces as are desired to be beveled. For example, in an application of the present invention where text characters are modeled as three dimensional objects, it may be preferable to provide beveling to both a front and back surface of the text. Such effects typically are used for animated text such as spinning logos and the like where both a front and a back of the text may be displayed. In such an embodiment, regions representing the text typically are defined in several layers.

Figure 7A:
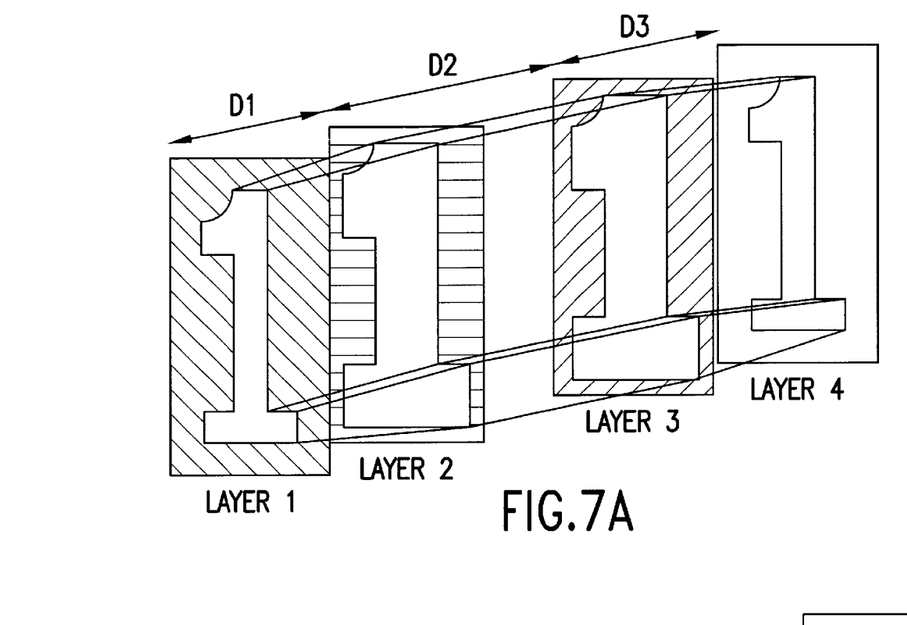
FIG. 7 illustrates various layers of a three-dimensional object having been subject to a method of the present invention.
Figure 7B:
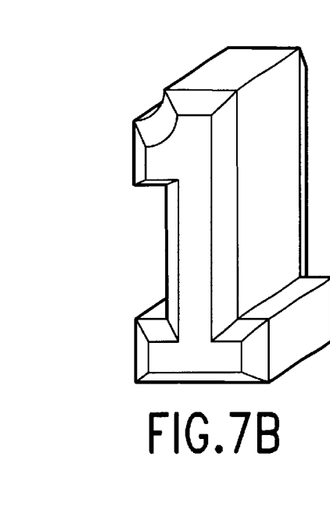

FIG. 7(*a*) is an exploded view of a modeled multi-layer three-dimensional object. Initially, only the region shown in Layer 1 is defined. Application of the method of FIG. 5 obtains a definition of the region of Layer 2. For straight-line extrusions, at Step 1070 (FIG. 5), the regions of Layers 1 and 2 may be copied to Layers 4 and 3 respectively. The corresponding vertices of the regions from each layer are connected to their counterparts in adjacent layers to define a three-dimensional volume.

Figure 6B:
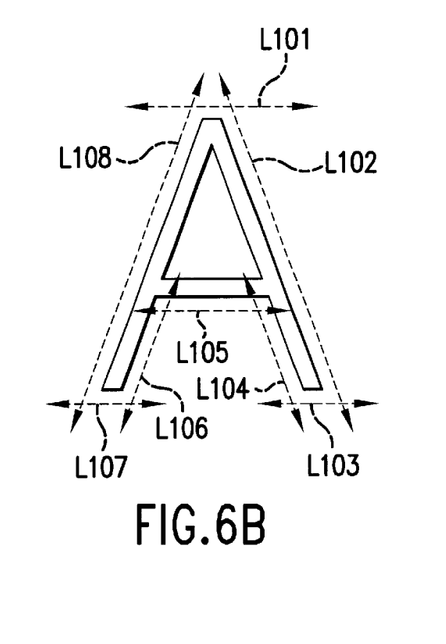
Figure 6C:
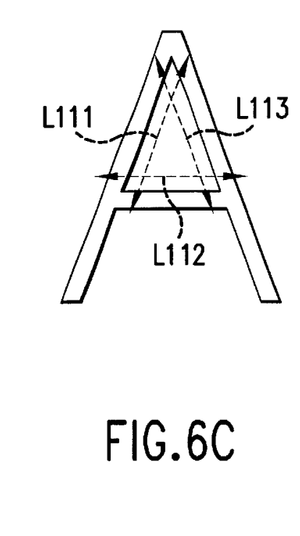
Figure 6D:
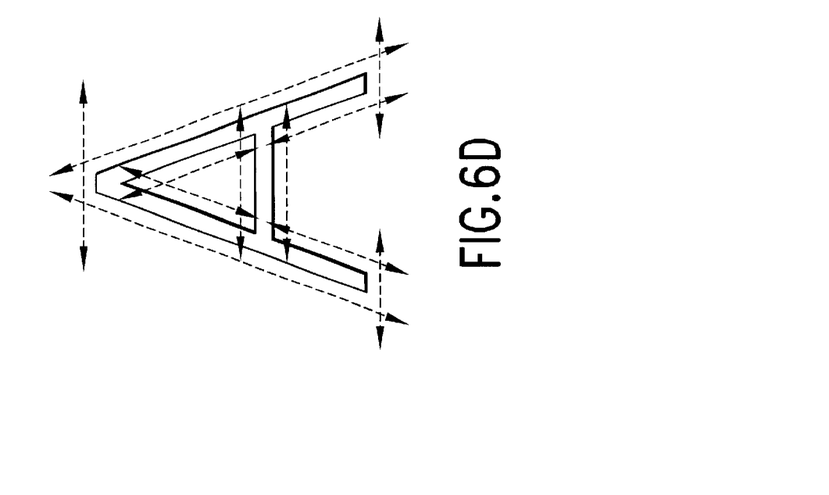
Figure 6E:
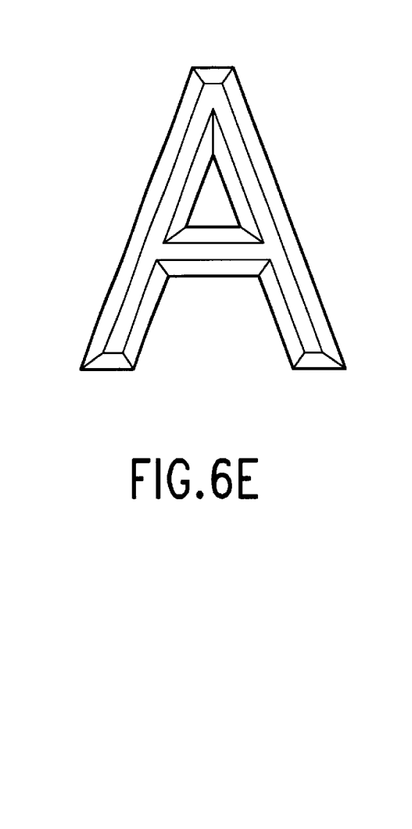
Figure 6F:
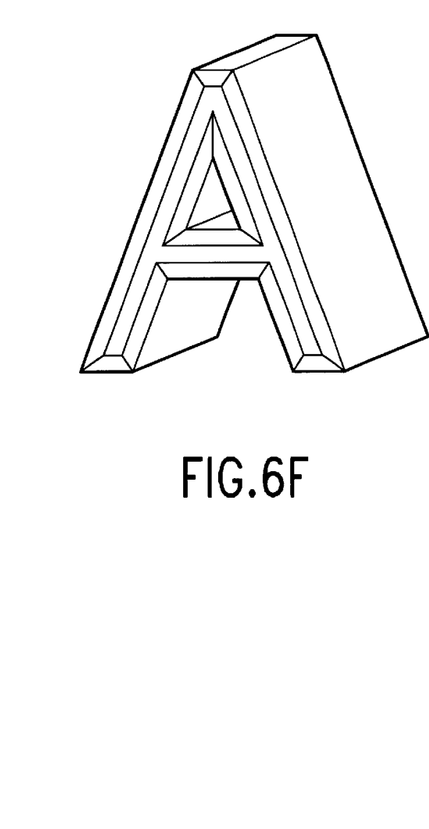

The various layers are separated by distances D1–D3. Distances D1 and D3 separate Layer 1 from Layer 2 and Layer 3 from Layer 4. The distances D1 and D3 determine how steep the beveling effect is. The distances D1 and D3 can be defined to be a positive distance, defining a beveling effect that projects outward from Layer 2 or 3 respectively. Alternatively, they may be defined to be a negative distance, defining a beveling effect that projects inward into the volume. As noted, vertices from the region of Layer 1 may be connected to their counterparts in Layer 2 according to any number of lines, curves or other beveling functions. Similarly, vertices from the region of Layer 4 may be connected to their counterparts in Layer 3 according to any number of functions. FIG. 6(*b*) illustrates the three-dimensional volume that may be obtained by the region of FIG. 6(*a*).

According to an embodiment of the present invention, when D1 and D2 are positive values, it is preferable to place the originally-defined region in Layers 1 and Layers 4 respectively. Resized copies of the original region would be placed in Layers 2 and 3. The resized regions may introduce problems such as self-intersections or other degeneracies. By placing the resized regions in Layers 2 and 3, such problems may be hidden by other parts of the object when the object is rendered for display.

According to another embodiment of the present invention, when D1 and D2 are negative values, it may be preferable to place the originally-defined region in Layers 2 and 3. Resized copies of the original region would be placed in Layers 1 and 4 respectively. By placing the resized regions in Layers 1 and 4, any degeneracies that are introduced may be hidden when the volume is rendered for display.

Figure 8:
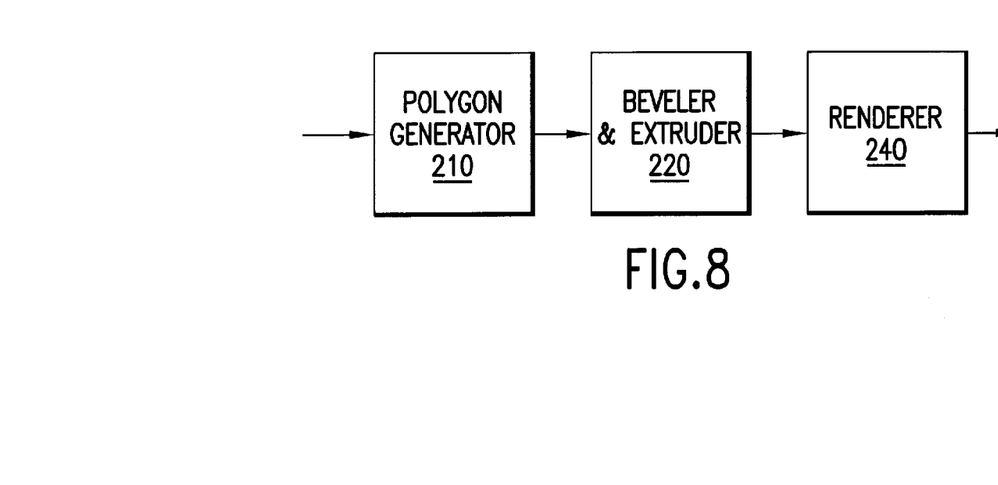
FIG. 8 is a block diagram of a processing sequence adapted for use with the present invention.

FIG. 8 illustrates an embodiment of a processing sequence for a region adapted to work with the method of FIG. 5 of the present invention. The processing sequence may be implemented by a video processor, such as a general purpose processor or a digital signal processor. Character data is input to a polygon generator 210. The polygon generator 210 interprets the character data and any additional style information related to the character data (such as font information or attribute information such as bold, italics, etc.) and generates regions therefrom. A beveler 220 receives an output from the polygon generator 210 and generates a beveled effect in accordance with the method of FIG. 5. The beveler 220 also extrudes the expanded polygon output from the beveling function block. A render 240 generates a two dimensional representation of the three-dimensional objects output from the beveler 220.

The beveler 220 may be implemental in a processing device such a general purpose computer or application specific integrated circuit. In a computer embodiment, the general purpose computer may store computer readable computer instructions in an electric, magnetic or optical memory that when executed, causes the computer to implement one or more methods of the present invention.

FIG. 8 is not an exhaustive representation of processing that may be applied to a region or the mesh generated therefrom. Additional processing typically will be included. For example, image data will be applied to the three-dimensional model. Additionally, lighting effects may be applied to augment the image data. Application of these additional features is known in the art.

Accordingly, embodiment of the present invention provide a beveling effect for a modeled three-dimensional object. It does so by copying an original region to a second plane and resizing it according to a beveling function, then connecting the original and the expanded regions according to a beveling function. Finally, one of the first or second regions is extruded to define a three-dimensional volume.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of modeling a beveled three-dimensional graphics object from a two-dimensional graphics object, the two-dimensional graphics object including video data in a first region of a first plane, comprising:

generating video data in a second region in a plane parallel to the first plane, the video data in the second region being a copy of the video data in the first region having a size different from the first region, and for each vertex of the first region, connecting the vertex to a corresponding vertex of the second region by a predetermined beveling function to provide a beveling effect.

2. The method of claim 1, further comprising:

copying the video data in the second region to a third plane as a third region, and for each vertex of the second region, connecting the vertex to a corresponding vertex of the third region.

3. The method of claim 2, wherein the vertices of the second region are connected to the vertices of the third region according to a predetermined extrusion function.

4. The method of claim 2, wherein the second and third regions are separated by an extrusion depth.

5. The method of claim 2, further comprising:

copying the first region to a fourth plane as a fourth region, and for each vertex of the third region, connecting the vertex to a corresponding vertex of the fourth region.

6. The method of claim 1, wherein the first and second regions are separated by a depth that determines a steepness of of the beveling effect.

7. A method of modeling a beveled three-dimensional graphics object from a two-dimensional graphics object, the two-dimensional graphics object including a first region, comprising:

for each edge of the first region, constructing a line parallel to the edge and offset from the edge along an outward normal vector, connecting the lines to form edges of a second region, for each vertex of the first region, connecting the vertex to a corresponding vertex of the second region to provide a beveling effect.

8. The method of claim 7, further comprising:

copying the second region to a third plane as a third region, and for each vertex of the second region, connecting the vertex to a corresponding vertex of the third region.

9. The method of claim 8, wherein the vertices of the second region are connected to the vertices of the third region according to a predetermined extrusion function.

10. The method of claim 8, wherein the second and third regions are separated by an extrusion depth.

11. The method of claim 8, further comprising:

copying the first region to a fourth plane as a fourth region, and for each vertex of the third region, connecting the vertex to a corresponding vertex of the fourth region.

12. The method of claim 7, wherein tie first and second regions are separated by a depth that determines a steepness of the beveling effect.

13. A method of modeling a beveled three-dimensional graphics object based on video data in a first region, comprising:

generating first and second copies of the video data in the first region in planes parallel to the first region, the first and second copies each having a size different from the video data in the first region, connecting vertices of the first region to corresponding vertices of the first copy according to a beveling function to provide a beveling effect, and connecting vertices of the first copy to corresponding vertices of the second copy according to an extrusion function.

14. The method of claim 13, wherein the second and third copes are separated by an extrusion depth.

15. The method of claim 13, further comprising:
generating a third copy of the video data in the first region in a plane parallel to the first region, and
for each vertex of the second copy, connecting the vertex to a corresponding vertex of the third copy.

16. The method of claim 13, wherein the first and second copies are separated by a depth that determines a steepness of the beveling effect.

17. A method of modeling three-dimensional effects for displayed text, comprising:
receiving text data,
generating at least one region representative of the text,
generating first and second copies of the region in planes parallel to the region, each having a size different from the region,
connecting vertices of the region to corresponding vertices of the first copy according to a beveling function to provide a beveling effect, and
connecting vertices of the first copy to corresponding vertices of the second copy according to an extrusion function.

18. A computer readable medium storing program instructions which, when executed by a processor, causes the processor to provide a beveling effect to a modeled region for video display according to the method of:
generating a second region in a plane parallel to a first region, the second region being a copy of the first region having a size different from the first region, and
for each vertex of the first region, connecting the vertex to a corresponding vertex of the second region by a predetermined beveling function to provide the beveling effect.

19. A video processor, comprising:
a region generator having a input adapted to receive text data and an output,
a beveler in communication with the region generator, the beveler:
generating a second region in a plane parallel to a first region, the second region being a copy of the first region having a size different from the first region, and
for each vertex of the first region, connecting the vertex to a corresponding vertex of the second region by a predetermined beveling function to provide a beveling effect, and
a renderer in communication with the beveler.

20. The video processor of claim 19, wherein the beveler is adapted to extrude one of the regions of the beveled volume.

21. A video data signal generated according to a process comprising:
receiving vertices that define a first region,
generating vertices of a second region having size different from the first region based upon the vertices of the first region and a predetermined beveling function,
generating vertices of a third region based upon the vertices of the second region and predetermined extrusion function, and
outputting the vertices of the first, second and third regions, a definition of the predetermined beveling function and a definition of the predetermined extrusion function in the video data signal to provide a beveling effect.

22. The medium of claim 18, wherein the method further comprises:
copying the second region to a third plane as a third region, and
for each vertex of the second region, connecting the vertex to a corresponding vertex of the third region.

23. The medium of claim 22, wherein the vertices of the second region are connected to the vertices of the third region according to a predetermined extrusion function.

24. The medium of claim 22, wherein the second and third regions are separated by an extrusion depth.

25. The medium of claim 22, wherein the method further comprises:
copying the firs region to a fourth plane as a fourth region, and
for each vertex of the third region, connecting the vertex to a corresponding vertex of the fourth region.

26. The medium of claim 18, wherein the first and second regions are separated by a depth that determines a steepness of the beveling effect.

27. The video processor of claim 19, wherein:
the beveler copies the second region to a third plane as a third region, and
for each vertex of the second region, the beveler connects the vertex to a corresponding vertex of the third region.

28. The video processor of claim 27, wherein the vertices of the second region are connected to the vertices of the third region according to a predetermined extrusion function.

29. The video processor of claim 27, wherein the second and third regions are separated by an extrusion depth.

30. The video processor of claim 27, wherein:
the beveler copies the first region to a fourth plane as a fourth region, and
for each vertex of the third region, the beveler connects the vertex to a corresponding vertex of the fourth region.

31. The video processor of claim 19, wherein the first and second regions are separated by a depth that determines a steepness of the beveling effect.

32. The video data signal of claim 21, wherein the process further comprises:
for each vertex of the second region, connecting the vertex to a corresponding vertex of the third region.

33. The video data signal of claim 32, wherein the second and third regions are separated by an extrusion depth.

34. The video data signal of claim 32, wherein the process further comprises:
generating vertices of a fourth region based upon the vertices of the first region,
for each vertex of the third region, connecting the vertex to a corresponding vertex of the fourth region, and
outputting the vertices of the fourth region.

35. The video data signal of claim 21, wherein the first and second regions are separated by a depth that determines a steepness of the beveling effect.

\* \* \* \* \*

UNITED STATES PATENT AND TRADEMARK OFFICE
CERTIFICATE OF CORRECTION

PATENT NO. : 6,246,805 B1
DATED : June 12, 2001
INVENTOR(S) : Sanjeev N. Trika et al.

It is certified that error appears in the above-identified patent and that said Letters Patent is hereby corrected as shown below:

Title page,
Item [12], change "Sanjeev et al." to -- Trika et al. --.
Item [75], change "Trika N. Sanjeev" to -- Sanjeev N. Trika --.
Item [57], change "video polygon" to -- video polygon, in which --.

Column 6,
Line 24, change "of of" to -- of --.

Column 8,
Line 19, change "firs" to -- first --.

Signed and Sealed this

Sixth Day of August, 2002

Attest:

Attesting Officer

JAMES E. ROGAN
Director of the United States Patent and Trademark Office